US009971730B2

(12) United States Patent
Remple et al.

(10) Patent No.: US 9,971,730 B2
(45) Date of Patent: May 15, 2018

(54) LINK LAYER TO PHYSICAL LAYER (PHY) SERIAL INTERFACE

(71) Applicant: QUALCOMM Incorporated, San Diego, CA (US)

(72) Inventors: Terrence Brian Remple, San Diego, CA (US); Nam Van Dang, San Diego, CA (US); Sassan Shahrokhinia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 14/739,439

(22) Filed: Jun. 15, 2015

(65) Prior Publication Data

US 2015/0363349 A1 Dec. 17, 2015

Related U.S. Application Data

(60) Provisional application No. 62/012,888, filed on Jun. 16, 2014.

(51) Int. Cl.
*G06F 13/14* (2006.01)
*G06F 13/42* (2006.01)
*G06F 13/38* (2006.01)

(52) U.S. Cl.
CPC .......... *G06F 13/426* (2013.01); *G06F 13/382* (2013.01); *G06F 13/385* (2013.01); *G06F 13/4221* (2013.01); *G06F 13/4282* (2013.01); *G06F 2213/0038* (2013.01); *G06F 2213/3812* (2013.01)

(58) Field of Classification Search
USPC ................... 710/104–110, 300–315
See application file for complete search history.

(56) References Cited

U.S. PATENT DOCUMENTS

| 7,412,588 | B2 | 8/2008 | Georgiou et al. |
| 8,261,002 | B2 * | 9/2012 | So ....................... G06F 13/4027 370/470 |
| 8,416,905 | B2 | 4/2013 | Chen et al. |
| 8,463,962 | B2 | 6/2013 | Murari |
| 8,626,975 | B1 | 1/2014 | Sala |

(Continued)

OTHER PUBLICATIONS

International Preliminary Report on Patentability for PCT/US2015/035948, dated May 24, 2016, 16 pages.

(Continued)

*Primary Examiner* — Raymond Phan
(74) *Attorney, Agent, or Firm* — Withrow & Terranova, PLLC

(57) ABSTRACT

A link layer to physical layer (PHY) serial interface is disclosed. In one aspect, a system on a chip (SoC) integrated circuit (IC) includes a link layer circuit, and a remote IC includes a Universal Serial Bus (USB) PHY circuit. A bus having four or fewer wires connects the two ICs. A link bridge communicates with the link layer circuit and serializes USB Transceiver Macrocell Interface (UTMI) signaling received from the link layer circuit as high speed (HS) USB messages for transmission to the remote IC. The link bridge also receives HS messages from the USB PHY circuit on the remote IC. The link bridge deserializes the HS messages to extract UTMI signaling and passes the extracted UTMI signaling to the link layer circuit.

23 Claims, 11 Drawing Sheets

(56) References Cited

U.S. PATENT DOCUMENTS

| | | |
|---|---|---|
| 8,972,646 B2 | 3/2015 | Ranganathan et al. |
| 2012/0082166 A1 | 4/2012 | Sala et al. |
| 2014/0006663 A1 | 1/2014 | Chen et al. |

OTHER PUBLICATIONS

Author Unknown, "Serial Link PHY Interface (SLPI) Specification," Revision 0.83a, Jan. 11, 2011, 174 pages.
Author Unknown, "UTMI+ Low Pin Interface (ULPI) Specification," Revision 1.1, Oct. 20, 2004, 93 pages.
International Search Report and Written Opinion for PCT/US2015/035948, dated Oct. 1, 2015, 10 pages.

* cited by examiner

| Field | Bits | Comment | Bit# |
|---|---|---|---|
| cmd_sync | 8 | See Table 1 | 0-11 |
| ctl_ack | 0 | 1 = control/ack, 0 = register access | 12 |
| wr | 1 | 1 = write, 0 = read | 13 |
| adr[5:0] | 6 | register address | 14-19 |
| toggle | 1 | inverse of bit 19 | 20 |
| dat[7:0] | 8 | data | 21-28 |

FIG. 9

| Field | Bits | Source | Type | Comment | Bit# |
|---|---|---|---|---|---|
| cmd_sync | 12 | bridge | packet format | See Table 1 | 0-11 |
| ctl_ack | 1 | bridge | packet format | 1= control/ack, 0= register access | 12 |
| ack_req | 1 | bridge | packet format | 1= ack packet requested | 13 |
| opmode[1:0] | 2 | link | control | | 14-15 |
| xcvrsel[1:0] | 2 | link | control | | 16-17 |
| termsel | 1 | link | control | | 18 |
| suspendm | 1 | link | control | | 19 |
| toggle | 1 | bridge | packet format | inverse of bit 19 | 20 |
| txvalid | 1 | link | control | | 21 |
| txdat | 1 | link | data | | 22 |
| linestate[1:0] | 2 | PHY | data | | 23-24 |
| hostdisc | 1 | PHY | control | | 25 |
| iddig | 1 | PHY | control | | 26 |
| bvalid | 1 | PHY | control | | 27 |
| phy_int | 1 | PHY | control | Asserted if unmasked PHY interrupt occurs. | 28 |

FIG. 10

LINK LAYER TO PHYSICAL LAYER (PHY) SERIAL INTERFACE

PRIORITY CLAIM

The present application claims priority to U.S. Provisional Patent Application Ser. No. 62/012,888 filed on Jun. 16, 2014 and entitled "USB LINK TO PHY SERIAL INTERFACE," the contents of which is incorporated herein by reference in its entirety.

BACKGROUND

I. Field of the Disclosure

The technology of the disclosure relates generally to communication between a link layer and a physical layer.

II. Background

Computing devices have become common in contemporary society. These computing devices rely on microprocessors and other integrated circuits (ICs). In both mobile computing devices like smart phones and stationary computing devices such as desk top computers, there is a general trend towards decreasing the size of such ICs. As device size decreases, voltages carried on internal voltage rails are also decreased.

While the voltage on the voltage rails in ICs has generally decreased, some ICs include a physical layer (sometimes referred to as a PHY) which requires higher signaling voltages. For example, a system on a chip (SoC) may have a universal serial bus (USB) physical layer designed to communicate with a remote peripheral (e.g., memory, a mouse, a keyboard, or the like). USB generally requires 3.6 volts for signaling. If the voltage rails carry 1.8 volts, a voltage doubler is required if the physical layer remains in the IC. If the voltage rails carry 1.2 volts, a voltage tripler is required if the physical layer remains in the IC. Such voltage multiplying structures are not necessarily reliable.

One solution to the voltage problem is to move the physical layer outside the SoC IC to a separate IC (e.g., a power management integrated circuit (PMIC)) and have a link layer to physical layer bridge between the two ICs. However, many link layer to physical layer protocols require multiple lanes or channels. For example, the USB Transceiver Macrocell Interface (UTMI) has thirty-two (32) channels, and the UTMI+ may have as many as fifty-six (56) channels. Normally a channel requires a dedicated electrical connection (e.g., a wire), and thus, having a USB physical layer removed from the link layer would require thirty-two pins on both the SoC IC and the PHY IC. A typical SoC IC is not able to dedicate this many pins to a relatively minor interface such as USB.

Various solutions have been proposed to address this problem including UTMI+ Low Pin Interface (ULPI), Serial Link PHY Interface (SLPI), and embedded USB2 (eUSB). ULPI still requires eight or twelve pins and has proven to be commercially impractical for IC to IC communication. SLPI requires only two pins, used in a differential mode. However, SLPI defines four signaling methods for register accesses and two signaling methods for data transfer, which has proven to be difficult to manage. Likewise, eUSB uses two pins, which are used in single-ended mode for one type of signaling and differential mode for another type of signaling. State machines track activity to determine what mode is being used. The end result is eUSB has one signaling method for register accesses, two signaling methods for data transfer, and two signaling methods for transfer of control information. The plurality of signaling methods in eUSB is burdensome. Further, SLPI and eUSB define electrical interfaces that require analog circuitry in the SoC IC for functions such as a differential drivers, differential receivers, differential terminations, and squelch detectors. One of the benefits of moving the PHY to the SoC IC is to reduce the amount of analog circuit design required on the SoC IC. By keeping the analog functions on the SoC IC, the benefit of moving the PHY to the SoC IC is not fully realized. Accordingly, there remains a need for a low pin count, simple signaling scheme to allow for link to PHY communication between multiple ICs.

SUMMARY OF THE DISCLOSURE

Aspects disclosed in the detailed description include a link layer to physical layer (PHY) serial interface. In an exemplary aspect, a system on a chip (SoC) integrated circuit (IC) includes a link layer circuit, and a remote IC includes a Universal Serial Bus (USB) PHY circuit. A bus having four or fewer wires connects the two ICs. A link bridge communicates with the link layer circuit and serializes USB Transceiver Macrocell Interface (UTMI) signaling received from the link layer circuit as high speed (HS) messages for transmission to the remote IC. The link bridge also receives HS messages from the USB PHY circuit on the remote IC. The link bridge deserializes the HS messages to extract UTMI signaling and passes the extracted UTMI signaling to the link layer circuit. By serializing the UTMI signaling into HS messages in this fashion, the number of wires between the two ICs is minimized and may be as low as a single wire. By defining an electrical interface that only requires a digital input/output (I/O) pad, the amount of analog circuitry required in the SoC IC for USB is significantly reduced. Still further, by using HS messages for control information and data, knowledge of the state of the USB PHY circuit is not required, nor are complex synchronization schemes required. Still further, the use of HS messages allows for relatively fast turn-around times that may satisfy relatively stringent latency requirements.

In this regard in one aspect, an IC is provided. The IC comprises a link layer circuit. The IC also comprises a link bridge operatively coupled to the link layer circuit. The link bridge comprises a serializer. The IC also comprises a bus interface operatively coupled to the link bridge. The bus interface is configured to couple to a bus having four or fewer lanes. The serializer is configured to serialize UTMI signaling received at the link bridge from the link layer circuit. The link bridge is configured to pass serialized UTMI signaling to the bus interface for transmission to a remote PHY chip through the bus using HS messages. The UTMI signaling is selected from the group consisting of UTMI control, low-speed (LS) data, and full-speed (FS) data.

In another aspect, an IC is provided. The IC comprises a PHY circuit. The IC also comprises a PHY bridge operatively coupled to the PHY circuit. The PHY bridge comprises a serializer. The IC also comprises a USB interface configured to couple to a USB bus. The IC also comprises a bus interface operatively coupled to the PHY bridge. The bus interface is configured to couple to a bus having four or fewer lanes. The serializer is configured to serialize UTMI signaling received at the PHY bridge from the PHY circuit. The PHY bridge is configured to pass serialized UTMI signaling to the bus interface for transmission to a remote link layer chip through the bus using HS messages. The UTMI signaling is selected from the group consisting of UTMI control, LS data, and FS data.

In another aspect, a method for communicating between a PHY circuit and a link layer circuit is provided. The method comprises, at a first IC, serializing UTMI signaling generated by a link layer circuit. The method also comprises transmitting to a remote PHY IC serialized UTMI signaling across a bus of four or fewer wires as HS messages. The UTMI signaling is selected from the group consisting of UTMI control, LS data, and FS data.

BRIEF DESCRIPTION OF THE FIGURES

FIG. 9 illustrates in tabular form the structure of a register packet command signal;

FIG. 10 illustrates in tabular form the structure of a control packet command signal.

DETAILED DESCRIPTION

Figure 1:
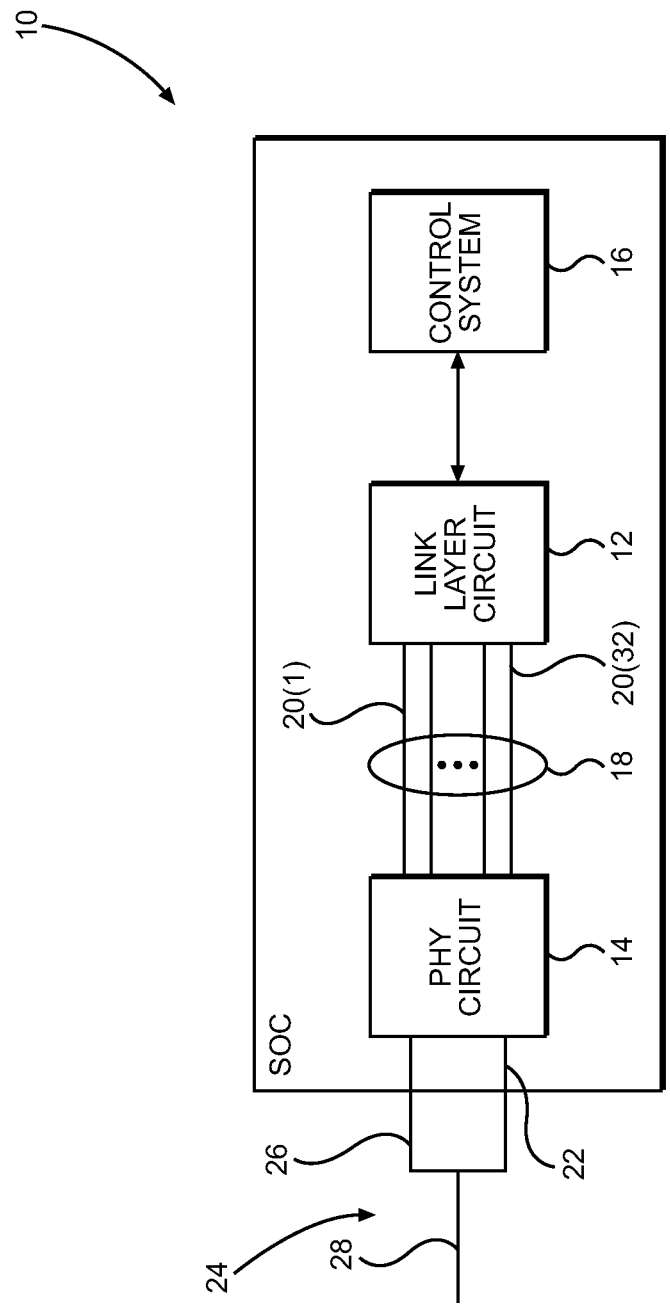
FIG. 1 is a block diagram of an exemplary conventional system on a chip (SoC) integrated circuit (IC) having both a link layer circuit and a physical layer (PHY) circuit therein.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a link layer to physical layer (PHY) serial interface. In an exemplary aspect, a system on a chip (SoC) integrated circuit (IC) includes a link layer circuit, and a remote IC includes a Universal Serial Bus (USB) PHY circuit. A bus having four or fewer wires connects the two ICs. A link bridge communicates with the link layer circuit and serializes USB Transceiver Macrocell Interface (UTMI) signaling received from the link layer circuit as high speed (HS) messages for transmission to the remote IC. The link bridge also receives HS messages from the USB PHY circuit on the remote IC. The link bridge deserializes the HS messages to extract UTMI signaling and passes the extracted UTMI signaling to the link layer circuit. By serializing the UTMI signaling into HS messages in this fashion, the number of wires between the two ICs is minimized and may be as low as a single wire. By defining an electrical interface that only requires a digital input/output (I/O) pad, the amount of analog circuitry required in the SoC IC for USB is significantly reduced. Still further, by using HS messages for control information and data, knowledge of the state of the USB PHY circuit is not required, nor are complex synchronization schemes required. Still further, the use of HS messages allows for relatively fast turn-around times that may satisfy relatively stringent latency requirements.

Before addressing exemplary aspects of the present disclosure, a brief overview of a conventional link layer to PHY interface is provided with reference to FIG. 1. Discussion of exemplary aspects of the present disclosure begins below with reference to FIG. 2.

In this regard, FIG. 1 is a block diagram of an exemplary conventional SoC IC 10 having both a link layer circuit 12 and a PHY circuit 14 therein. The SoC IC 10 also includes a control system 16, which may be a microprocessor or the like. The link layer circuit 12 communicates with the PHY circuit 14 through a bus 18, having wires 20(1)-20(32) to carry UTMI signaling therebetween. It should be appreciated that the bus 18 may have fifty-six (56) wires (not shown) if UTMI+ is used to communicate between the link layer circuit 12 and the PHY circuit 14. The PHY circuit 14 communicates with a USB interface 22 that couples to a USB connector 24 to communicate with a remote peripheral (not shown) such as a memory element, a keyboard, a mouse, or the like. The USB interface 22 may include a female socket into which a plug 26 is inserted as is well understood. The plug 26 may include four or five conductors which are bundled into cable 28. That is, most USB connectors have four conductors (Vbus, D+, D−, ground), but mini and micro USB connectors have an ID connector that indicates whether it is a type A or type B connector. USB 3.0 may have two additional twisted pairs (SSTx+, SST, SSRx+, SSRx−) as is well understood.

With continued reference to FIG. 1, the existence of the wires 20(1)-20(32) allows for UTMI signaling to be communicated effectively between the link layer circuit 12 and the PHY circuit 14. The use of such wires 20(1)-20(32) is optimal when both the link layer circuit 12 and the PHY circuit 14 are on the same chip. However, as device size continues to decrease, the voltages that transistors within the SoC IC 10 can tolerate are decreasing to 1.8 volts or even 1.2 volts. In contrast, the voltage for the PHY circuit 14 is set by the USB standard and remains at 3.6 volts. Thus, designers are pressured to remove the PHY circuit 14 from the SoC IC 10. However, having thirty-two wires between a removed PHY circuit IC (not shown) and the SoC IC 10 is impractical because a typical SoC IC cannot afford to dedicate this many pins to a relatively minor function such as the USB PHY to link interface. Even the lower pin counts of the UTMI Low Pin Interfaces (ULPI) are too high for a typical SoC IC.

Exemplary aspects of the present disclosure allow the PHY circuit to be removed from the SoC IC while minimizing the number of wires in the bus therebetween to a number that can be afforded by the SoC IC. Additional aspects allow for different voltages to be supplied to the different ICs, which provides better low power implementations. Further aspects of the present disclosure allow for simplified signaling between the link layer circuit and the PHY circuit such that the mode of the USB connector (e.g., the USB connector 24) does not matter. The simplified signaling still preserves, to a great extent, the explicit UTMI signaling between the link and the PHY. Preservation of the UTMI signaling helps reduce time required for circuit development and product debug times since UTMI is well established in the industry. By defining an electrical interface that only requires a digital input/output (I/O) pad, the amount of analog circuitry required in the SoC IC is reduced. As a final benefit, exemplary aspects of the present disclosure allow for implementations that are fully compliant with USB 2.0 and specifically compliant with the turnaround times required by USB 2.0. The simplified signaling interface is sometimes referred to as a UTMI Serial Interface (USI) in the following drawings.

Figure 2:
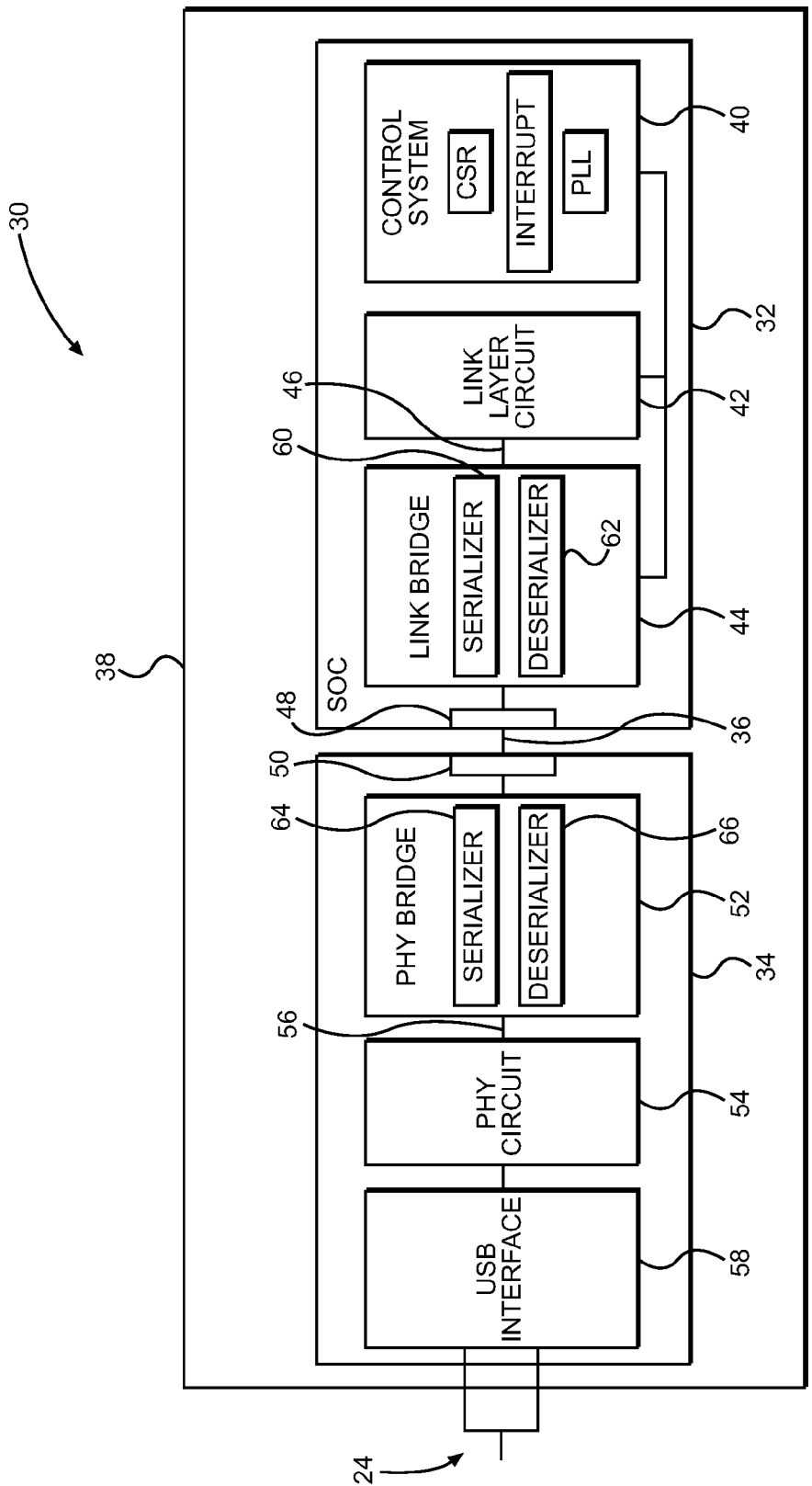
FIG. 2 is a block diagram of an exemplary bidirectional single-ended one-wire link layer to PHY serial interface system according to an exemplary aspect of the present disclosure.

In this regard, FIG. 2 is a block diagram of an exemplary bidirectional single-ended one-wire link layer to PHY serial interface system 30 according to an exemplary aspect of the present disclosure. The system 30 includes a SoC IC 32 and a PHY IC 34 coupled by a bidirectional one-wire bus 36. The SoC IC 32, the PHY IC 34 and the bidirectional one-wire bus 36 may be positioned on a printed circuit board (PCB) 38 as is well understood. The SoC IC 32 includes a control system 40, which may be a microprocessor or the like and contain a control and status register (CSR), an interrupt controller (Interrupt), and a phase locked loop (PLL). The SoC IC 32 also includes a link layer circuit 42 and a link bridge 44 operatively coupled thereto by connection 46. In an exemplary aspect, the connection 46 contains thirty-two (32) wires and carries UTMI signaling thereon. In an alternate exemplary aspect, the connection 46 contains fifty-six (56) wires and carries UTMI+ signaling thereon. In still another alternate exemplary aspect, the connection 46 contains eight (8) or twelve (12) wires and carries ULPI signaling thereon. The control system 40 may pass a clock signal to the link bridge 44, and register access signals and/or interrupts may be passed between the link bridge 44 and the control system 40 as well. The SoC IC 32 also includes a bus interface 48 operatively coupled to the link bridge 44 and configured to couple to the bidirectional one-wire bus 36. The bus interface 48 may be a pin.

With continued reference to FIG. 2, the PHY IC 34 includes a bus interface 50 configured to couple to the bidirectional one-wire bus 36. The bus interface 50 may be a pin. A PHY bridge 52 is operatively coupled to the bus interface 50. The PHY IC 34 also includes a PHY circuit 54 operatively coupled to the PHY bridge 52 by connection 56. In an exemplary aspect, the connection 56 includes thirty-two (32) wires and carries UTMI signaling thereon. In an alternate exemplary aspect, the connection 56 contains fifty-six (56) wires and carries UTMI+ signaling thereon. In still another exemplary aspect, the connection 56 contains eight (8) or twelve (12) wires and carries ULPI signaling thereon. The PHY circuit 54 communicates with a USB interface 58, which may be a conventional USB interface similar or identical to the USB interface 22 of FIG. 1.

With continued reference to FIG. 2, the link bridge 44 receives UTMI signaling (as used herein, the term UTMI includes UTMI 1.0, UTMI 1.05, UTMI+, and ULPI) from the link layer circuit 42. A serializer 60 serializes the UTMI signaling into HS messages, and the link bridge 44 is configured to pass the HS messages to the bus interface 48 for transmission to the remote PHY IC 34 over the bidirectional one-wire bus 36. A deserializer 62 within the link bridge 44 takes HS messages received through the bus interface 48 from the remote PHY IC 34 over the bidirectional one-wire bus 36 and deserializes the received HS messages into UTMI signaling which are passed to the link layer circuit 42. Similarly, the PHY bridge 52 receives UTMI signaling from the PHY circuit 54. A serializer 64 serializes the UTMI signaling into HS messages and the PHY bridge 52 is configured to pass the HS messages to the bus interface 50 for transmission to the SoC IC 32 over the bidirectional one-wire bus 36. A deserializer 66 within the PHY bridge 52 takes HS messages received through the bus interface 50 from the SoC IC 32 over the bidirectional one-wire bus 36 and deserializes the received HS messages into UTMI signaling which are passed to the PHY circuit 54. It should be appreciated that a HS message can be an eight (8) bit symbol, a command packet, or a data packet.

Figure 3:
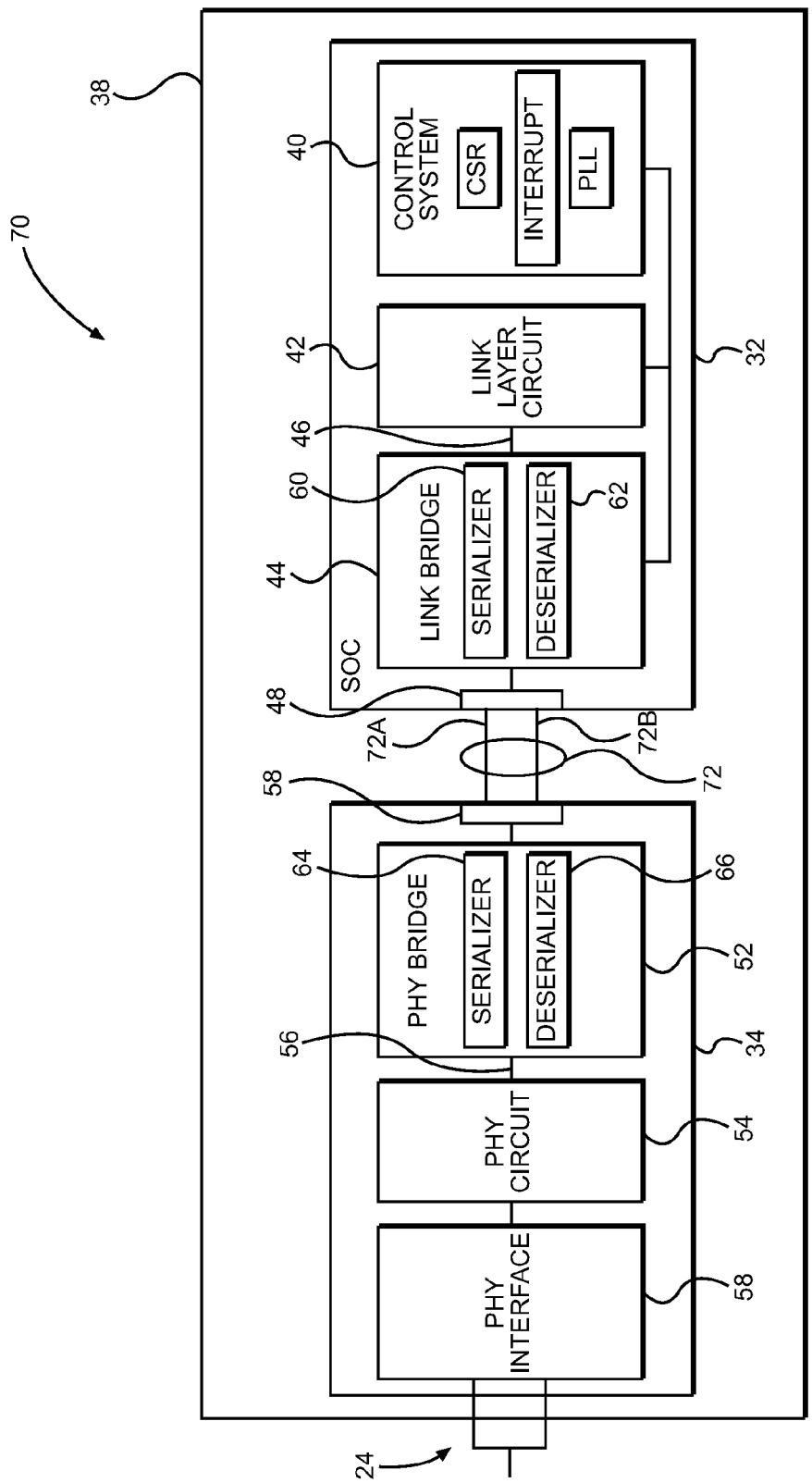
FIG. 3 is a block diagram of an exemplary two-wire unidirectional single-ended link layer to PHY serial interface system according to an exemplary aspect of the present disclosure.
Figure 4:
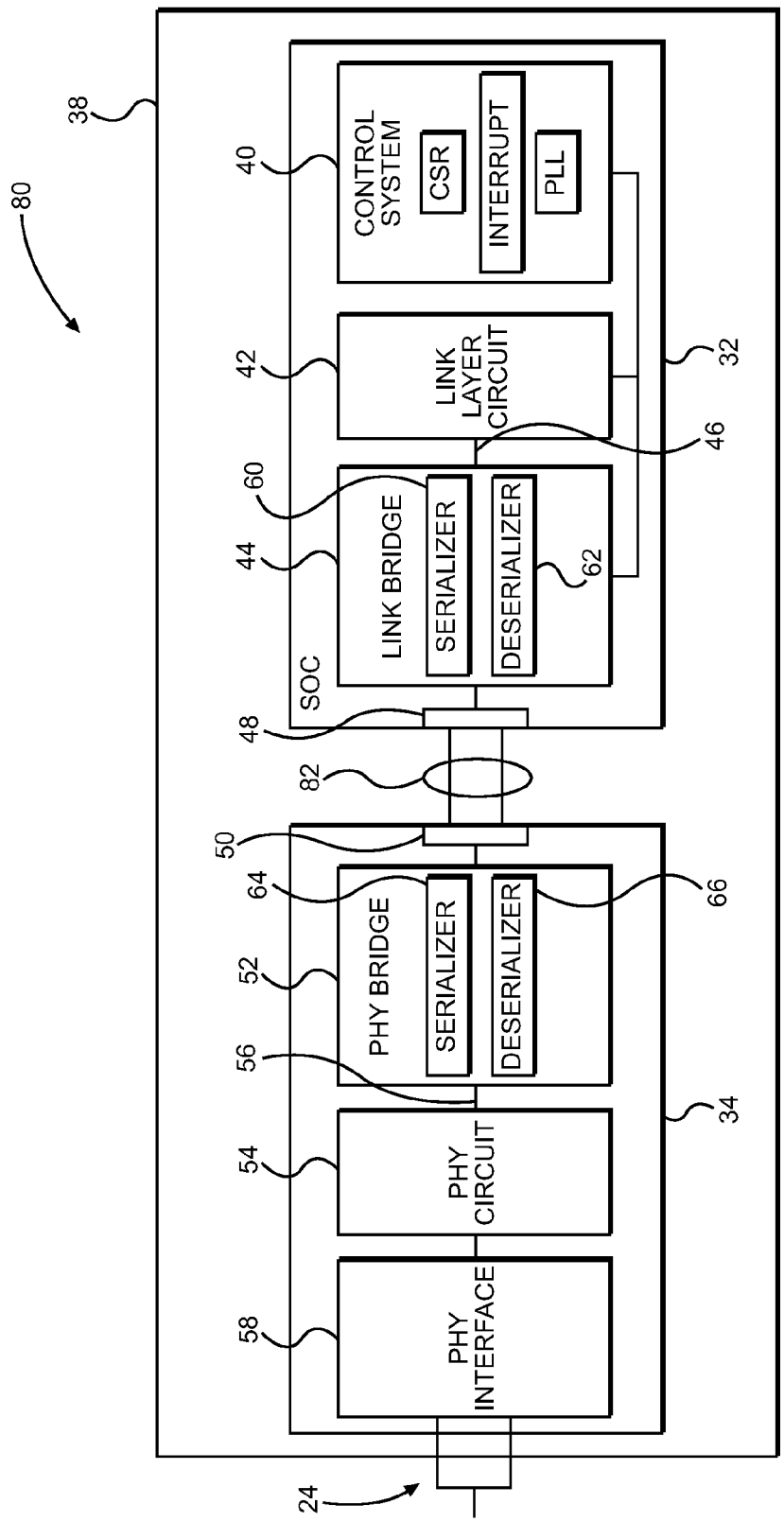
FIG. 4 is a block diagram of an exemplary two-wire bidirectional differential-ended link layer to PHY serial interface system according to an exemplary aspect of the present disclosure.
Figure 5:
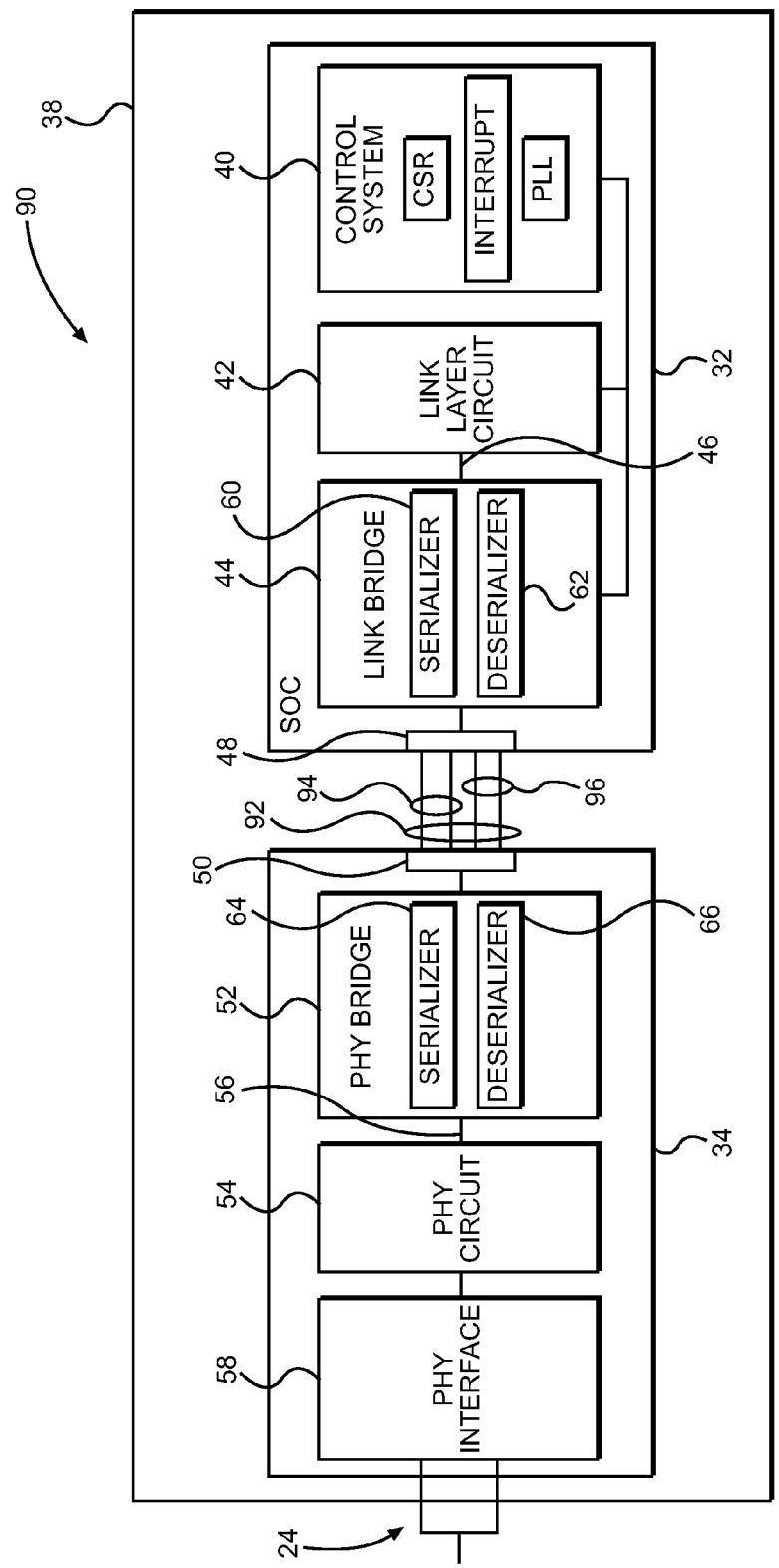
FIG. 5 is a block diagram of an exemplary four-wire unidirectional two differential-ended link layer to PHY serial interface system according to an exemplary aspect of the present disclosure.

With continued reference to FIG. 2, the bidirectional one-wire bus 36 allows for single-ended signaling between the SoC IC 32 and the PHY IC 34. Other exemplary aspects allow for different signals and are illustrated in FIGS. 3-5. However, most elements remain the same and are not described again.

In this regard, FIG. 3 is a block diagram of an exemplary two-wire unidirectional single-ended link layer to PHY serial interface system 70 according to an exemplary aspect of the present disclosure. Instead of the bidirectional one-wire bus 36 of the system 30, the system 70 includes a two-wire bus 72, where wire 72A is a unidirectional single-ended connection for transmission to the PHY IC 34, and wire 72B is a unidirectional single-ended connection for transmission to the SoC IC 32. In the system 70 the bus interface 48 and the bus interface 50 may each include two pins.

FIG. 4 is a block diagram of an exemplary two-wire bidirectional differential-ended link layer to PHY serial interface system 80 according to an exemplary aspect of the present disclosure. Instead of bidirectional one-wire bus 36 or two-wire bus 72, the system 80 includes a two wire-bus 82, where the two wire bus is a bidirectional differential-ended connection. In the system 80, the bus interface 48 and the bus interface 50 may each include two pins.

FIG. 5 is a block diagram of an exemplary four-wire unidirectional two differential-ended link layer to PHY serial interface system 90 according to an exemplary aspect of the present disclosure. Instead of bidirectional one-wire bus 36, two-wire bus 72, or two-wire bus 82, the system 90 includes a four-wire bus 92, which includes a first unidirectional two-wire differential-ended connection 94 to carry HS messages to the PHY IC 34 and a second unidirectional two-wire differential-ended connection 96 to carry HS messages to the SoC IC 32. In the system 90, the bus interface 48 and the bus interface 50 may each include four pins.

Turning now to the HS messages that are provided over the buses 36, 72, 82, and 92, reference is made to Table 1, which shows the binary code for the HS messages.

TABLE 1

| Symbols/Sync Words | Binary Code (HS bits) |
|---|---|
| j_smbl | 1111 0000 |
| k_smbl | 1111 0100 |
| se0_smbl | 1111 0101 |
| dis_smbl | 1111 1111 |
| cmd_sync | 1010 1010 1001 |
| dat_sync | 1010 1010 1000 |

As noted in Table 1, there are four symbols (J, K, single-ended zero, and disable, or j_smbl, k_smbl, se0_smbl, and dis_smbl respectively), a command sync word (cmd_sync) for command packets, and a data sync word (dat_sync) for HS data packets. This combination of symbols and commands allows UTMI signaling to be passed between the SoC IC 32 and the PHY IC 34 with an acceptable level of latency. The low number of wires and pins allows costs to be contained and circuit design to remain simple. A more detailed discussion of the signaling follows.

Note that the cmd_sync is twelve (12) bits. A twelve-bit sync word allows a receiving element to allow its clock and data recovery (CDR) circuit time to lock. In contrast, the symbols are only eight (8) bits, which helps meet timing constraints of full-speed (FS) signaling and FS packet turn-around time. Low-speed (LS) and FS data packets are transferred between the SoC IC 32 and the PHY IC 34 using the symbols. The j_smbl indicates a J-state, the k_smbl indicates a K-state, the se0_smbl indicates an SE0 state, and the dis_smbl indicated that the PHY IC 34 should disable its output driver. The shorter symbols allow them to be decoded with minimal latency. Likewise, the symbols may be used to transfer line-state information between the SoC IC 32 and the PHY IC 34 during USB operations such as reset, chirp, suspend, resume, and remote wake. UTMI control signaling is explicitly transferred between the SoC IC 32 and the PHY IC 34 using command packets. Between each message, the bus 36, 72, 82, or 92 is held in an idle state and consumes minimal power.

Figure 6:
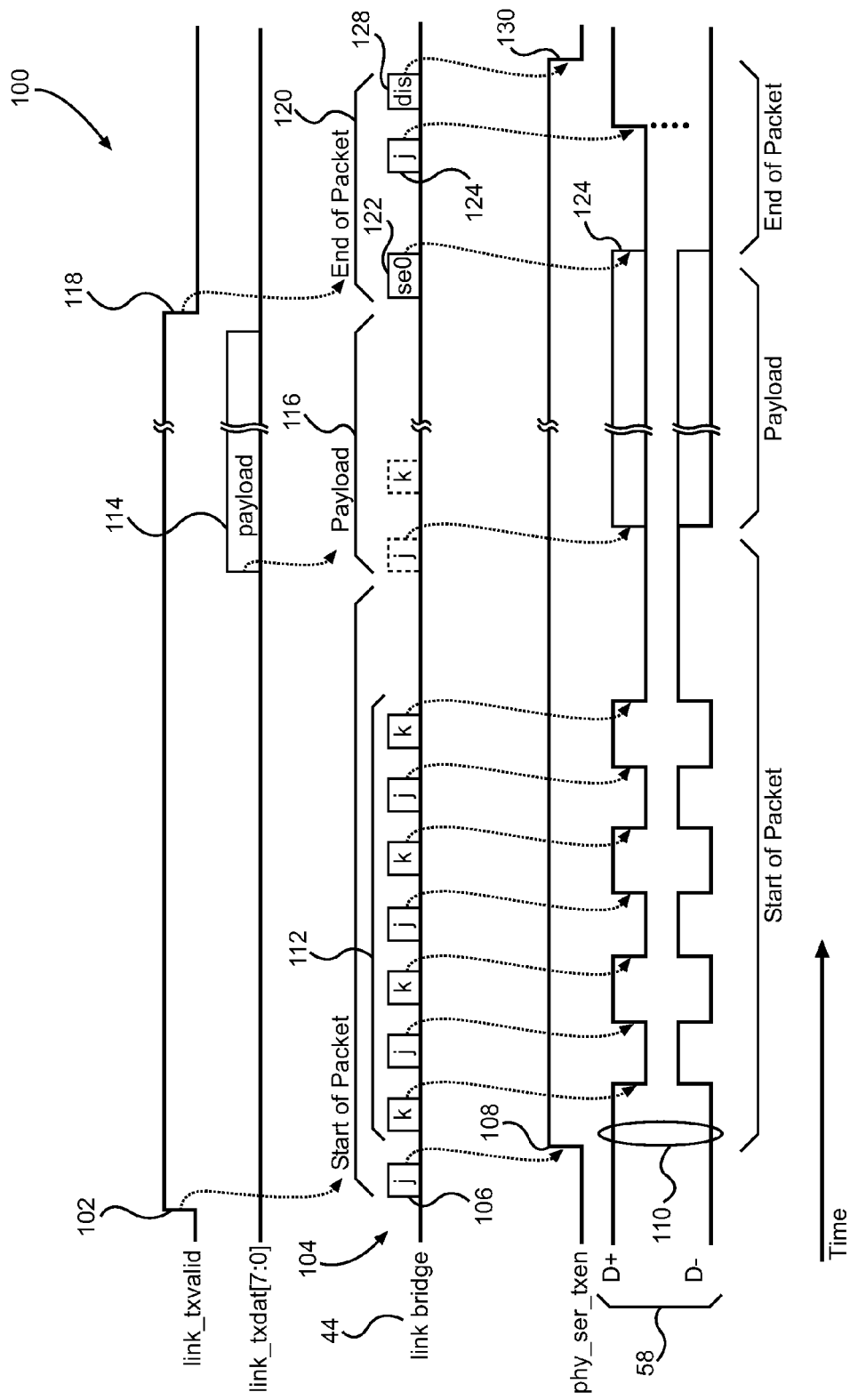
FIG. 6 is a signal versus time diagram that illustrates how packets are transferred between the link layer in the SoC IC and the PHY.

To assist in better understanding, FIG. 6 is a signal versus time diagram 100 that illustrates how FS packets are transferred from the SoC IC 32 to the PHY IC 34. When the link layer circuit 42 asserts the link_txvalid UTMI signal 102, the link bridge 44 sends a series of symbols (j_smbl and k_smbl) 104 to the PHY IC 34 beginning with a first j_smbl 106. The first j_smbl 106 causes the PHY IC 34 to enable its output driver (phy_ser_txen or PHY serial transmit enable) denoted generally at 108 and drive a J-state onto D+/D− lines of the USB interface 58 (denoted generally at 110). The next seven symbols sent by the link bridge 44 cause the USB interface 58 of the PHY IC 34 to output a USB FS sync word onto the D+/D− lines, where the USB FS sync word consists of KJKJKJKK (denoted generally at 112). The link bridge 44 then sends an FS packet payload 114 to the PHY IC 34 in a series of symbols (j_smbl and k_smbl) 116. When the link de-asserts link_txvalid 118, the link bridge 44 sends an end of packet series of symbols 120 to the PHY IC 34. The first of these symbols is an se0_smbl 122, which causes the PHY IC 34 to drive an SE0 state 124 onto the D+/D− lines. The second symbol is a j_smbl 126, and the third symbol is a dis_smbl 128, which causes the PHY IC 34 to stop driving the D+/D− lines of the USB interface 58 by disabling the phy_ser_txen (denoted generally at 130).

Figure 7:
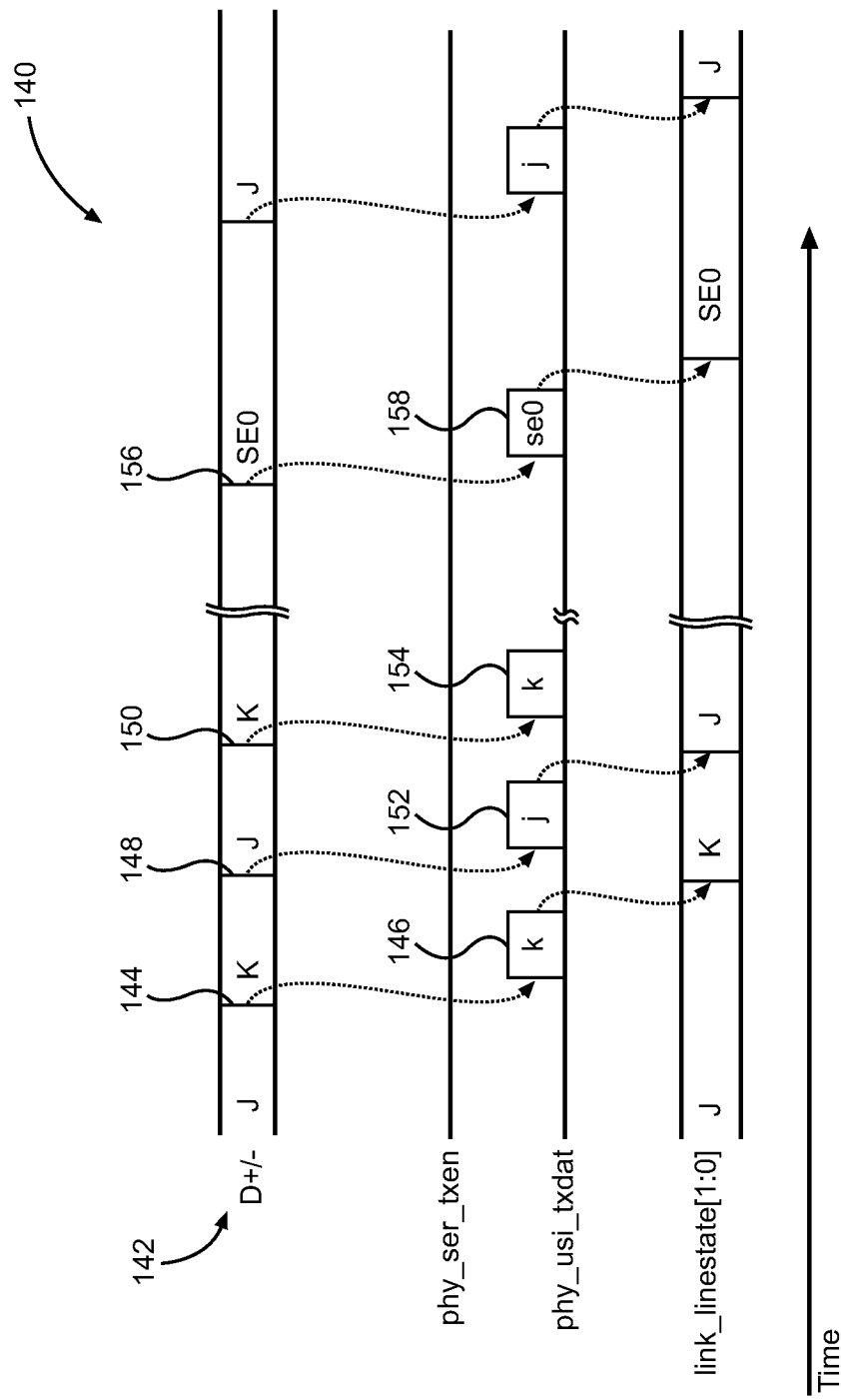
FIG. 7 is a signal versus time diagram that illustrates how packets are transferred from the PHY to the link layer.

FIG. 7 is a signal versus time diagram 140 that illustrates how LS and FS packets are transferred from the PHY IC 34 to the link layer circuit 42. If the PHY IC 34 is not driving the D+/D− lines (i.e., the phy_ser_txen is not enabled) of the USB interface 58, then each time the PHY circuit 54 detects a transition on the D+/D− lines (denoted generally at 142) of the USB interface 58, the PHY bridge 52 sends a corresponding symbol to the link bridge 44. Thus, as illustrated, when the D+/D− lines transition to a K-state (denoted generally at 144), the PHY bridge 52 sends a k_smbl 146 to the link bridge 44. The link bridge 44 then sends a K-state to the link over the UTMI signals called link_linestate [1:0]. Subsequent transitions 148 and 150 generate j_smbl 152 and k_smbl 154 respectively and so forth. When the D+/D− lines receive an SE0 156, the PHY bridge 52 sends an se0_smbl 158.

Figure 8:
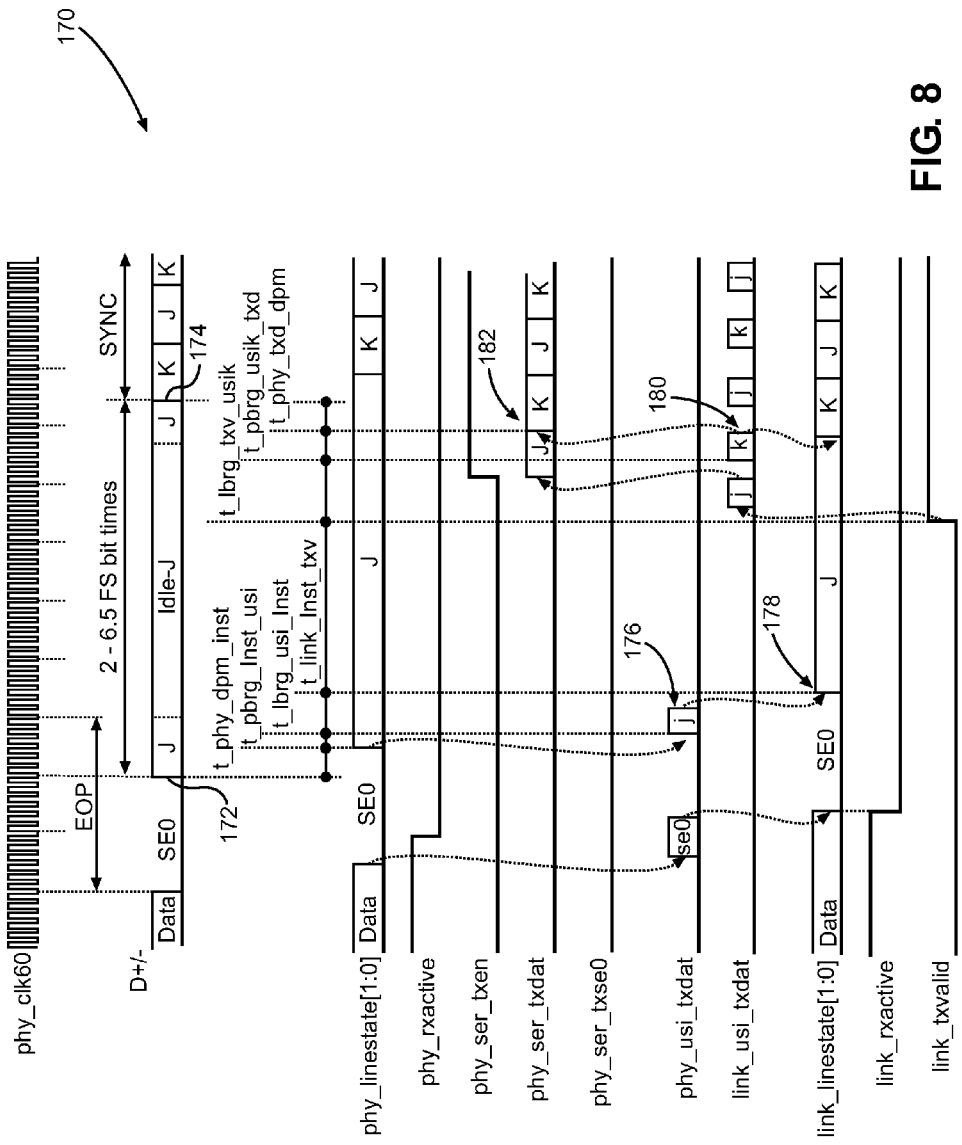
FIG. 8 is a signal versus time diagram that illustrates compliance with full speed (FS) signaling turn-around time requirements.

Under the USB protocol, when a device receives a FS packet from a USB host, the device is required to respond to that packet within a turn-around time of less than 6.5 FS bit times. This timing requirement is illustrated in FIG. 8, which is a signal versus time diagram 170. Signal versus time diagram 170 shows that the time between the end of SE0 172 on the D+/D− lines and the start 174 of the next K-state on the D+/D− lines is less than 6.5 FS bit times. As shown in Table 2 below, this 6.5 FS bit times of turn-around delay consists of delays through the PHY, PHY bridge, link bridge, link, link bridge, PHY bridge and PHY. In particular, Table 2 summarizes the source of delays assuming a 60 MHz periods (sometimes referred to herein as prds) and compares the budget allocated by UTMI 1.05 to the budget of an exemplary aspect of the present disclosure (column entitled Recommended Max). Returning to FIG. 8, to achieve a turn-around time of 6.5 FS bit times, the time between the link bridge 44 receiving a j_smbl 176 and outputting a J-state 178 to the link layer circuit 42 must be less than two periods of 60 MHz, or less than 16 HS bit times. Similarly, the time between the PHY bridge 52 receiving a k_smbl 180 and outputting a K-state 182 to the PHY circuit 54, must be less than two periods of 60 MHz, or less than 16 HS bit times. If the symbols used for j_smbl and k_smbl had sync words and payloads that needed to be decoded by a CDR circuit, then it would not be possible to meet the decoding time of 16 HS bits times.

TABLE 2

| Block | Parameter | Name | UTMI 1.05 Budget (60 MHz prds) | Recommended Max (60 MHz prds) |
|---|---|---|---|---|
| PHY | D+/− EOP → linestate_eop | t_phy_dpm_inst | 2-3 | 3 |
| PHY bridge | linestate_eop → usi_dat | t_pbrg_lnst_usi | | 1 |
| Link Bridge | usi_dat → linestate_eop | t_lbrg_usi_last | | 2 |
| Link | linestate_eop → link_invalid | t_link_lnst_txv | 2-24 | 14 |
| Link bridge | link_invalid → usi_k | t_lbrg_txv_usik | | 8 |
| PHY bridge | usi_k → txdat_k | ipbrg_usik_txd | | 2 |
| PHY | txdat_k → D+/− SYNC | t_phy_txd_dpm | 1-10 | 2 |
| Total | | | 32 | 32 |

To avoid the delays associated with the CDR circuit, the symbols in Table 1 are defined such that they are short (only 8 HS bit times long), and such that they can be decoded with minimal latency. One way to decode these symbols is with a circuit that has the following functionalities. The first functionality samples the bus 36, 72, 82, or 92 on the rising and falling edges of a 480 MHz clock (which may be generated by a PLL). If this functionality detects the idle state followed by at least three HS bits of one, then the incoming message is not a command Packet or a data Packet, but is either a symbol or a long pulse that might be used for reset or interrupt. The second circuit functionality samples the bus 36, 72, 82, or 92 10 HS bit times after the end of the idle state. If the state of the bus 36, 72, 82, or 92 is zero after 10 HS bit times, then the incoming message is a symbol and not a pulse. The third circuit functionality counts the number of rising edges on the bus 36, 72, 82, or 92 since the idle state. If there are two rising edges, the symbol is a k_smbl. If there are three rising edges, the symbol is an se0_smbl. If there is one rising edge, then the symbol is either a j_smbl or a dis_smbl. If the first functionality that samples the bus 36, 72, 82, or 92 on the rising edges of the 480 MHz clock detects more than five HS bit times of one after the idle state, then the symbol is a dis_smbl. Otherwise the symbol is a j_smbl. Such a circuit has minimal latency and is thus able to decode the symbols in less than 16 HS bit times.

When one or more UTMI control signals change at the link, the link bridge 44 sends a command packet to the PHY bridge 52. The PHY bridge 52 responds with an acknowledgment packet. There are two types of command packets, namely register packets and control packets. The format of the register packets is illustrated in FIG. 9. Similarly, the format of the control packets is illustrated in FIG. 10. Both types of packets use the same cmd_sync of Table 1 to begin the packet. Likewise, both packets are twenty-nine (29) bits long. Register packets are used by the link layer circuit 42 to read from and write to registers in the PHY circuit 54. The PHY IC 34 responds back to the link layer circuit 42 with the same register write packet. If the link layer circuit 42 fails to receive an acknowledgment packet back from the PHY IC 34 with the same values as what was sent, the link layer circuit 42 retries. If an event occurs in the PHY IC 34 that must be communicated to the link layer circuit 42, the PHY IC 34 can send an interrupt pulse to the link layer circuit 42. The link layer circuit 42 responds by reading an interrupt status register in the PHY IC 34.

As illustrated in FIG. 10, control packets communicate several UTMI control signals that come from the link layer circuit 42 (e.g., opmode, xcrsel, termsel, suspendm, txvalid, and tdat), and several UTMI control signals that come from the PHY circuit 54 (e.g., linestate, hostdisc, iddig, and bvalid). When a UTMI control signal from the link layer circuit 42 changes, the link bridge 44 sends a control packet to the PHY bridge 52. This control packet contains the latest values of the UTMI control signals at the link layer circuit 42. When the PHY bridge 52 receives this control packet, the PHY bridge 52 applies the latest UTMI output signals to the PHY circuit 54 and waits a short time for the UTMI control signals from the PHY circuit 54 to change. After this time, the PHY bridge 54 sends a control packet back to the link bridge 44 as an acknowledgment. The original control packet from the link bridge 44 has the ack_req bit set, which indicates to the PHY IC 34 that the link bridge 44 is expecting an acknowledgment packet. When the PHY bridge 52 sends the acknowledgment packet back to the link bridge 44, the PHY bridge 52 does not need to set the ack_req bit in the control packet to the link bridge 44. If the link bridge 44 does not receive the acknowledgment packet from the PHY IC 34, the link bridge 44 will retry its initial control packet.

If the PHY bridge 52 sends out a symbol to communicate a linestate change at the same time that a control packet is sent from the link bridge 44, the PHY bridge 52 would not receive the control packet, no acknowledgment would be sent, and the link bridge 44 would resend its control packet. When the PHY bridge 52 receives the retry control packet from the link bridge 44, the PHY bridge responds with an acknowledgment packet. Since the acknowledgment packet contains the updated value linestate, all UTMI control information is reliably exchanged between the PHY IC 34 and link layer circuit 42, even in the event of collision.

Further, with the proposed definition of the control packet, the UTMI control events that occur during the USB operations of reset, chirp, suspend, resume, and remote wake can be robustly communicated between the link bridge 44 and the PHY bridge 52 with an exchange of two control packets. In contrast, the same information would require six packets and an interrupt pulse if the register packets were used. Thus, the present arrangement reduces latency relative to some possible alternatives.

Figure 11:
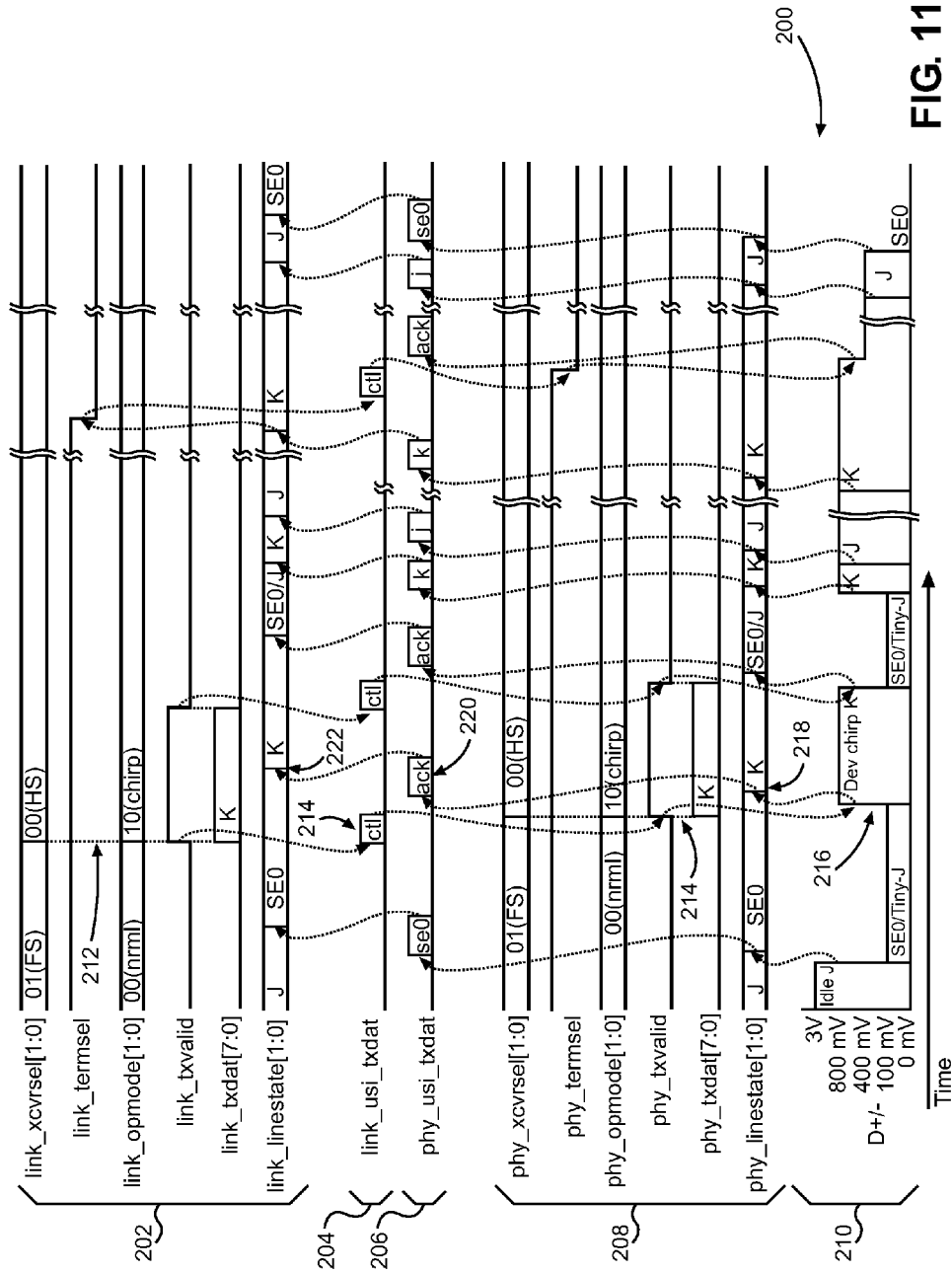
FIG. 11 illustrates a signal versus time diagram of different control packets and symbols being used to communicate UTMI signaling during a USB reset operation.

FIG. 11 is a signal versus time diagram 200 of different control packets and symbols being used to communicate UTMI signaling during a USB reset operation. The top six lines 202 show the UTMI control signals at the link. The next line 204 shows the messages sent by the link bridge 44. The next line 206 shows messages sent by the PHY bridge 52. The next six lines 208 show the UTMI control signals at the PHY IC 34. The last line 210 shows the D+/D− lines of the USB interface 58. The way in which control and acknowledgment packets are used to communicate UTMI signaling can be seen by examining a typical transaction. The change at the link bridge 44 of xcvrsel, opmode, txvalid, and txdat 212 results in the link bridge 44 sending a single control packet 214 to the PHY bridge 52. The PHY bridge 52 then updates the UTMI control signals 214 to the link bridge 44. This update causes the value on the D+/D− lines to change 216, which in turn results in a change on the PHY linestate 218. The PHY bridge 52 allows time for this change to complete, before sending an acknowledgment packet 220 back to the link bridge 44. The acknowledgment packet contains the latest value of the linestate from the PHY bridge 52, so the link bridge 44 is able to drive this latest value of K-state 222 back to the link bridge 44.

The link layer to PHY serial interface according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An integrated circuit (IC) comprising:
a link layer circuit;
a link bridge operatively coupled to the link layer circuit, the link bridge comprising a serializer; and
a bus interface operatively coupled to the link bridge and configured to couple to a bus having four or fewer lanes; and
wherein the serializer is configured to serialize Universal Serial Bus (USB) Transceiver Macrocell Interface (UTMI) signaling received at the link bridge from the link layer circuit into high speed (HS) messages and the link bridge is configured to pass the serialized UTMI signaling to the bus interface for transmission to a remote physical layer (PHY) chip through the bus using the HS messages, wherein the UTMI signaling is selected from the group consisting of UTMI control, low-speed (LS) data, and full-speed (FS) data.

2. The IC of claim 1, wherein the bus interface comprises a single pin for a bidirectional single-ended wire.

3. The IC of claim 1, wherein the bus interface comprises two pins for a bidirectional differential pair of wires.

4. The IC of claim 1, wherein the bus interface comprises two pins for two unidirectional single-ended wires.

5. The IC of claim 1, wherein the bus interface comprises four pins for two unidirectional differential pair of wires.

6. The IC of claim 1, wherein the serializer is configured to serialize UTMI control information, UTMI LS data, and UTMI FS data into the HS messages.

7. The IC of claim 1, wherein the link bridge comprises a deserializer configured to deserialize the HS messages received from the bus.

8. The IC of claim 1, wherein the UTMI signaling is UTMI+ signaling.

9. The IC of claim 1, wherein the link bridge is configured to encode FS linestate information including J-state, K-state, SE0, and Disable into the HS messages to meet FS turn-around times of USB 2.0.

10. The IC of claim 1, wherein the link bridge is configured to decode messages by measuring pulse widths and counting edges so as to meet FS turn-around times of USB 2.0.

11. An integrated circuit (IC) comprising:
a physical layer (PHY) circuit;
a PHY bridge operatively coupled to the PHY circuit, the PHY bridge comprising a serializer;
a Universal Serial Bus (USB) interface configured to couple to a USB bus;
a bus interface operatively coupled to the PHY bridge and configured to couple to a bus having four or fewer lanes; and
wherein the serializer is configured to serialize USB Transceiver Macrocell Interface (UTMI) signaling received at the PHY bridge from the PHY circuit into high speed (HS) messages and the PHY bridge is configured to pass the serialized UTMI signaling to the bus interface for transmission to a remote link layer chip through the bus using the HS messages, wherein the UTMI signaling is selected from the group consisting of UTMI control, low-speed (LS) data, and full-speed (FS) data.

12. A method for communicating between a physical layer (PHY) circuit and a link layer circuit, the method comprising:
at a first integrated circuit (IC), serializing Universal Serial Bus (USB) Transceiver Macrocell Interface (UTMI) signaling generated by a link layer circuit as high speed (HS) messages; and
transmitting to a remote PHY IC the serialized UTMI signaling across a bus of four or fewer wires as the HS messages, wherein the UTMI signaling is selected from the group consisting of UTMI control, low-speed (LS) data, and full-speed (FS) data.

13. The method of claim 12, wherein transmitting comprises transmitting across a one-wire bidirectional single-ended bus.

14. The method of claim 12, wherein transmitting comprises transmitting across one wire of a two-wire unidirectional single-ended bus.

15. The method of claim 12, wherein transmitting comprises transmitting across a bidirectional differential pair of wires.

16. The method of claim 12, wherein transmitting comprises transmitting across a unidirectional differential pair of wires.

17. The method of claim 12, further comprising encoding J-state, K-state, SE0, and Disable signals into state HS messages able to meet FS turn-around times of USB 2.0.

18. The method of claim 12, wherein transmitting the serialized UTMI signaling comprises transmitting a UTMI+ control event as a HS message.

19. The method of claim 12, further comprising encoding FS linestate information including J-state, K-state, SE0, and Disable into the HS messages that are short enough to meet FS turn-around times of USB 2.0.

20. The method of claim 12, further comprising decoding messages by measuring pulse widths and counting edges in such a way as to meet FS turn-around times of USB 2.0.

21. The method of claim 12, further comprising:
communicating UTMI control events at a link bridge using a single HS message; and
receiving as a single HS message, a resulting response from the remote PHY IC so as to recover from dropped messages or message collisions.

22. The method of claim 17, further comprising decoding the state HS messages by measuring pulse widths and counting edges.

23. The method of claim 18, further comprising receiving a response to the UTMI+ control event as a single HS message.

* * * * *